United States Patent
Xiao et al.

(10) Patent No.: US 9,799,293 B2
(45) Date of Patent: Oct. 24, 2017

(54) LIQUID CRYSTAL DISPLAY DEVICE AND GATE DRIVING CIRCUIT

(71) Applicants: Shenzhen China Star Optoelectronics Technology Co., Ltd., Shenzhen, Guangdong (CN); Wuhan China Star Optoelectronics Technology Co., Ltd., Wuhan, Huhei (CN)

(72) Inventors: Juncheng Xiao, Guangdong (CN); Shangcao Cao, Guangdong (CN); Yao Yan, Guangdong (CN); Ronglei Dai, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 125 days.

(21) Appl. No.: 14/786,071

(22) PCT Filed: Sep. 21, 2015

(86) PCT No.: PCT/CN2015/090140
§ 371 (c)(1),
(2) Date: Oct. 21, 2015

(87) PCT Pub. No.: WO2017/045215
PCT Pub. Date: Mar. 23, 2017

(65) Prior Publication Data
US 2017/0162150 A1 Jun. 8, 2017

(30) Foreign Application Priority Data
Sep. 14, 2015 (CN) .......................... 2015 1 0583438

(51) Int. Cl.
G09G 3/36 (2006.01)

(52) U.S. Cl.
CPC ......... *G09G 3/3677* (2013.01); *G09G 3/3696* (2013.01); *G09G 2300/0871* (2013.01); *G09G 2310/0202* (2013.01); *G09G 2310/08* (2013.01)

(58) Field of Classification Search
CPC .. G09G 3/3677; G09G 3/3674; G09G 3/3696; G09G 2300/0426; G09G 2310/08; G09G 2300/0408; G09G 2300/0871
See application file for complete search history.

(56) References Cited

U.S. PATENT DOCUMENTS

2007/0171115 A1 7/2007 Kim et al.
2012/0133574 A1 5/2012 Wu et al.
(Continued)

FOREIGN PATENT DOCUMENTS

CN 101000751 A 7/2007
CN 101383133 A 3/2009
(Continued)

*Primary Examiner* — Ibrahim Khan
(74) *Attorney, Agent, or Firm* — Andrew C. Cheng (57) ABSTRACT

A liquid crystal display device and a gate driving circuit are disclosed. The gate driving circuit includes multiple-stage gate driving units and a control chip. Each stage gate driving unit includes a first pulling control unit, a first pulling unit, a second pulling control unit, a second pulling unit, a first control unit, a second control unit and a third control unit. The control chip is used for pulling a first clock signal and a first voltage reference signal to a first voltage level. Accordingly, the scanning lines driven by the gate driving circuit are all turned on in order to stably realize an All-Gate-On function.

10 Claims, 4 Drawing Sheets

(56) References Cited

U.S. PATENT DOCUMENTS

| | | |
|---|---|---|
| 2013/0088265 A1 | 4/2013 | Chen |
| 2015/0187302 A1 | 7/2015 | Dai |
| 2015/0228353 A1 | 8/2015 | Qing et al. |
| 2015/0339999 A1 | 11/2015 | Zheng et al. |
| 2016/0180788 A1 | 6/2016 | Xiao |
| 2016/0189586 A1* | 6/2016 | Zou ..................... G09G 3/3266 345/213 |
| 2016/0189647 A1 | 6/2016 | Xiao et al. |
| 2016/0189649 A1 | 6/2016 | Xiao |
| 2016/0275887 A1 | 9/2016 | Xiao |
| 2016/0300623 A1 | 10/2016 | Yang et al. |
| 2016/0351156 A1 | 12/2016 | Wu et al. |
| 2017/0018245 A1* | 1/2017 | Park ..................... G09G 3/3688 |
| 2017/0061913 A1 | 3/2017 | Wang et al. |

FOREIGN PATENT DOCUMENTS

| | | |
|---|---|---|
| CN | 102968975 A | 12/2012 |
| CN | 104575433 A | 2/2015 |

\* cited by examiner

LIQUID CRYSTAL DISPLAY DEVICE AND GATE DRIVING CIRCUIT

BACKGROUND OF THE INVENTION

1. Field of the Invention

The present invention relates to the liquid crystal display technology field, and more particularly to a liquid crystal display device and a gate driving circuit.

2. Description of Related Art

An array substrate row driving circuit (GOA, Gate Driver On Array, or Gate On Array) utilizes a conventional TFT-LCD (thin-film-transistor liquid-crystal-display) array manufacturing process to manufacture a gate row scanning and driving circuit on the array substrate in order to achieve scanning and driving gate lines row by row. Comparing with the conventional flexible circuit board (COF) and glass circuit board (COG) technology, the manufacturing cost is saved and a gate bonding process is omitted, which is beneficial for the production capacity and increasing an integration degree of a display device.

In an actual application, because a display device has to be collocated with a touch panel, the GOA circuit requires a signal interruption function in order to collocate with the touch panel such as collocating with a scanning of the touch panel. In a normal condition, after the signal interruption function of the GOA circuit is enabled, a black screen awakening for the display device is required. At this time, the GOA circuit is required to set all gate lines to be in a charged or a conductive state in a period of time. Through applying a black voltage to clear a remaining voltage level in a pixel capacitor so that a display effect of the display device is well. The period of time is called an All-Gate-On stage. However, in the conventional art, the when an All-Gate-On function is realized by the GOA circuit, a failure risk is existed so that the All-Gate-On function cannot be realized stably.

SUMMARY OF THE INVENTION

The main technology problem solved by the present invention is to provide a liquid crystal display device and a gate driving circuit, which can stably realize an All-Gate-On function.

The present invention provides a gate driving circuit, wherein, the gate driving circuit includes multiple-stage gate driving units and a control chip, wherein each stage gate driving unit comprises: a first pulling control unit for outputting a first pulling control signal at a first node; a first pulling unit coupled with the first node, receiving a first clock signal, pulling a voltage level of an output terminal of a gate driving signal to a first voltage level according to the first pulling control signal and first clock signal in order to output the gate driving signal; a second pulling control unit for outputting a second pulling control signal at a second node; a second pulling unit coupled with the first node and the second node, receiving a first voltage reference signal, and pulling a voltage level of the first node to a second voltage level of the first voltage reference signal according to the second pulling control signal, and the second pulling unit pulls a voltage level of the gate driving signal to the second voltage level; a first control unit coupled with the first node, receiving a first control signal and the first voltage reference signal, pulling the voltage level of the first node to the second voltage level according to the first control signal; and a second control unit coupled with the second node, receiving the first control signal and a second voltage reference signal, pulling a voltage level of the second node to a third voltage level of the second voltage reference signal according to the first control signal; and a third control unit coupled with the output terminal of the gate driving signal, receiving the first control signal and a second control signal, and pulling the voltage level of the gate driving signal according to the first control signal and the second control signal; wherein, control chip is used for pulling the first clock signal, the first voltage reference signal, the first control signal and the second control signal to the first voltage level such that scanning lines driven by the gate driving circuit are all turned on.

Wherein, the first pulling control unit includes a first thin-film transistor and a second thin-film transistor; a first terminal of the first thin-film transistor receives a first signal, a second terminal of the first thin-film transistor receives a gate driving signal of a previous stage, and a third terminal of the first thin-film transistor is connected with the first node; and a first terminal of the second thin-film transistor receives a second signal; a second terminal of the second thin-film transistor receives a gate driving signal of a next stage, and a third terminal of the second thin-film transistor is connected with the first node.

Wherein, the first pulling unit includes a third thin-film transistor and a first capacitor, a first terminal of the third thin-film transistor receives the first clock signal, a second terminal of the third thin-film transistor is connected with the first node, a third terminal of the third thin-film transistor is the output terminal of the gate driving signal, and the first capacitor is connected between the second terminal and the third terminal of the third thin-film transistor.

Wherein, the first control unit includes a fourth thin-film transistor, a first terminal of the fourth thin-film transistor is connected with the first node, a second terminal of the fourth thin-film transistor receives the first control signal, and a third terminal of the thin-film transistor receives the first voltage reference signal.

Wherein, the second control unit includes a fifth thin-film transistor, a first terminal of the fifth thin-film transistor receives the second voltage reference signal, a second terminal of the fifth thin-film transistor receives the first control signal, and a third terminal of the fifth thin-film transistor is connected with the second node.

Wherein, the second pulling control unit includes a sixth thin-film transistor and a seventh thin-film transistor, a first terminal of the sixth thin-film transistor receives the second clock signal. a second terminal of the sixth thin-film transistor is connected with the first terminal of the fourth thin-film transistor, a third terminal of the sixth thin-film transistor is connected with a third terminal of the seventh thin-film transistor and the second node, a first terminal of the seventh thin-film transistor receives the second voltage reference signal, a second terminal of the seventh thin-film transistor receives the second clock signal; and the second pulling unit includes an eighth thin-film transistor, a ninth thin-film transistor, a tenth thin-film transistor and a second capacitor, a first terminal of the eighth thin-film transistor is connected with the second terminal of the third thin-film transistor, a second terminal of the eighth thin-film transistor receives the first clock signal, a third terminal of the eighth thin-film transistor is connected with a first terminal of the ninth thin-film transistor, a second terminal of the ninth thin-film transistor is connected with the third terminal of the seventh thin-film transistor, a third terminal of the ninth thin-film transistor receives the first voltage reference signal, a first terminal of the tenth thin-film transistor is connected with the third terminal of the thin-film transistor, a second terminal of the tenth thin-film transistor is connected with the second terminal of the ninth thin-film transistor, a third terminal of the tenth thin-film transistor receives the first voltage reference signal, the second capacitor is connected between the second terminal and the third terminal of the tenth thin-film transistor.

Wherein, the third control unit includes an eleventh thin-film transistor, a first terminal of the eleventh thin-film transistor is connected with the third terminal of the third thin-film transistor, a second terminal of the eleventh thin-film transistor receives the first control signal and a third terminal of the eleventh thin-film transistor receives the second control signal.

Wherein, the gate driving unit further includes a twelfth thin-film transistor, a first terminal of the twelfth thin-film transistor is connected with the first node, a second terminal of the twelfth thin-film transistor receives the second voltage reference signal, and a third terminal of the twelfth thin-film transistor is connected with the third terminal of the second thin-film transistor, the third terminal of the first thin-film transistor and the first terminal of the fourth thin-film transistor.

Wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, the tenth thin-film transistor, eleventh thin-film transistor and the twelfth thin-film transistor are all P-type thin-film transistors; and when the first control signal and the second control signal are at a low voltage level, the fourth thin-film transistor is turned on, the voltage level of the second terminal of the third thin-film transistor is pulled to the second voltage level, the third thin-film transistor is turned off; the fifth thin-film transistor is turned on, the voltage level of the second terminal of the tenth thin-film transistor is pulled to the third voltage level, the tenth thin-film transistor is turned on, the eleventh thin-film transistor is turned on in order to pull the voltage level of the gate driving signal to the second voltage level.

Wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, and the tenth thin-film transistor, the eleventh thin-film transistor and the twelfth thin-film transistor are all N-type thin-film transistors.

The present invention provides a liquid crystal display device, wherein, the liquid crystal display device includes a gate driving circuit, the gate driving circuit includes multiple-stage gate driving units and a control chip, and each stage gate driving unit comprises: a first pulling control unit for outputting a first pulling control signal at a first node; a first pulling unit coupled with the first node, receiving a first clock signal, pulling a voltage level of an output terminal of a gate driving signal to a first voltage level according to the first pulling control signal and first clock signal in order to output the gate driving signal; a second pulling control unit for outputting a second pulling control signal at a second node; a second pulling unit coupled with the first node and the second node, receiving a first voltage reference signal, and pulling a voltage level of the first node to a second voltage level of the first voltage reference signal according to the second pulling control signal, and the second pulling unit pulls a voltage level of the gate driving signal to the second voltage level; a first control unit coupled with the first node, receiving a first control signal and the first voltage reference signal, pulling the voltage level of the first node to the second voltage level according to the first control signal; and a second control unit coupled with the second node, receiving the first control signal and a second voltage reference signal, pulling a voltage level of the second node to a third voltage level of the second voltage reference signal according to the first control signal; and a third control unit coupled with the output terminal of the gate driving signal, receiving the first control signal and a second control signal, and pulling the voltage level of the gate driving signal according to the first control signal and the second control signal; wherein, control chip is used for pulling the first clock signal, the first voltage reference signal, the first control signal and the second control signal to the first voltage level such that scanning lines driven by the gate driving circuit are all turned on.

Wherein, the first pulling control unit includes a first thin-film transistor and a second thin-film transistor; a first terminal of the first thin-film transistor receives a first signal, a second terminal of the first thin-film transistor receives a gate driving signal of a previous stage, and a third terminal of the first thin-film transistor is connected with the first node; and a first terminal of the second thin-film transistor receives a second signal; a second terminal of the second thin-film transistor receives a gate driving signal of a next stage, and a third terminal of the second thin-film transistor is connected with the first node.

Wherein, the first pulling unit includes a third thin-film transistor and a first capacitor, a first terminal of the third thin-film transistor receives the first clock signal, a second terminal of the third thin-film transistor is connected with the first node, a third terminal of the third thin-film transistor is the output terminal of the gate driving signal, and the first capacitor is connected between the second terminal and the third terminal of the third thin-film transistor.

Wherein, the first control unit includes a fourth thin-film transistor, a first terminal of the fourth thin-film transistor is connected with the first node, a second terminal of the fourth thin-film transistor receives the first control signal, and a third terminal of the thin-film transistor receives the first voltage reference signal.

Wherein, the second control unit includes a fifth thin-film transistor, a first terminal of the fifth thin-film transistor receives the second voltage reference signal, a second terminal of the fifth thin-film transistor receives the first control signal, and a third terminal of the fifth thin-film transistor is connected with the second node.

Wherein, the second pulling control unit includes a sixth thin-film transistor and a seventh thin-film transistor, a first terminal of the sixth thin-film transistor receives the second clock signal. a second terminal of the sixth thin-film transistor is connected with the first terminal of the fourth thin-film transistor, a third terminal of the sixth thin-film transistor is connected with a third terminal of the seventh thin-film transistor and the second node, a first terminal of the seventh thin-film transistor receives the second voltage reference signal, a second terminal of the seventh thin-film transistor receives the second clock signal; and the second pulling unit includes an eighth thin-film transistor, a ninth thin-film transistor, a tenth thin-film transistor and a second capacitor, a first terminal of the eighth thin-film transistor is connected with the second terminal of the third thin-film transistor, a second terminal of the eighth thin-film transistor receives the first clock signal, a third terminal of the eighth thin-film transistor is connected with a first terminal of the ninth thin-film transistor, a second terminal of the ninth thin-film transistor is connected with the third terminal of the seventh thin-film transistor, a third terminal of the ninth thin-film transistor receives the first voltage reference signal, a first terminal of the tenth thin-film transistor is connected with the third terminal of the thin-film transistor, a second terminal of the tenth thin-film transistor is connected with the second terminal of the ninth thin-film transistor, a third terminal of the tenth thin-film transistor receives the first voltage reference signal, the second capacitor is connected between the second terminal and the third terminal of the tenth thin-film transistor.

Wherein, the third control unit includes an eleventh thin-film transistor, a first terminal of the eleventh thin-film transistor is connected with the third terminal of the third thin-film transistor, a second terminal of the eleventh thin-film transistor receives the first control signal and a third terminal of the eleventh thin-film transistor receives the second control signal.

Wherein, the gate driving unit further includes a twelfth thin-film transistor, a first terminal of the twelfth thin-film transistor is connected with the first node, a second terminal of the twelfth thin-film transistor receives the second voltage reference signal, and a third terminal of the twelfth thin-film transistor is connected with the third terminal of the second thin-film transistor, the third terminal of the first thin-film transistor and the first terminal of the fourth thin-film transistor.

Wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, the tenth thin-film transistor, eleventh thin-film transistor and the twelfth thin-film transistor are all P-type thin-film transistors; and when the first control signal and the second control signal are at a low voltage level, the fourth thin-film transistor is turned on, the voltage level of the second terminal of the third thin-film transistor is pulled to the second voltage level, the third thin-film transistor is turned off; the fifth thin-film transistor is turned on, the voltage level of the second terminal of the tenth thin-film transistor is pulled to the third voltage level, the tenth thin-film transistor is turned on, the eleventh thin-film transistor is turned on in order to pull the voltage level of the gate driving signal to the second voltage level.

Wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, and the tenth thin-film transistor, the eleventh thin-film transistor and the twelfth thin-film transistor are all N-type thin-film transistors.

Through above technology solution, the beneficial effect of the present invention is: the gate driving circuit includes multiple-stage gate driving units and a control chip. Each stage gate driving unit includes a first pulling control unit, a first pulling unit, a second pulling control unit, a second pulling unit, a first control unit, a second control unit and a third control unit. The control chip is used for pulling a first clock signal and a first voltage reference signal to a first voltage level. Accordingly, the scanning lines driven by the gate driving circuit are all turned on in order to stably realize an All-Gate-On function.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
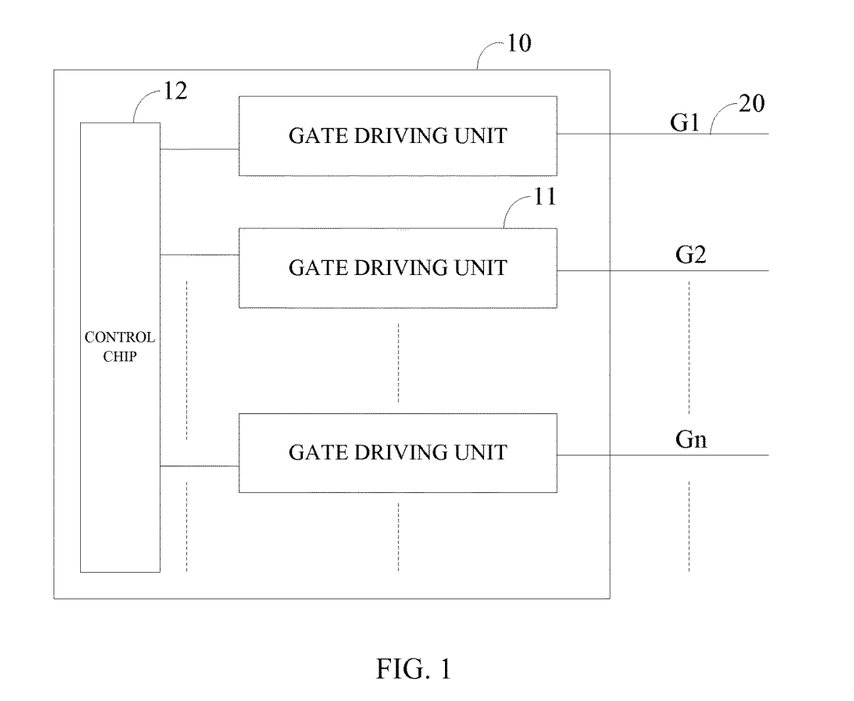
FIG. 1 is a schematic structure diagram of a gate driving circuit according to a first embodiment of the present invention.

FIG. 1 is a schematic structure diagram of a gate driving circuit according to a first embodiment of the present invention. The gate driving circuit of the present embodiment is applied in a liquid crystal display for driving multiple scanning lines of the liquid crystal display in order to turn on the multiple scanning lines.

With reference to FIG. 1, the gate driving circuit 10 is connected with multiple scanning lines 20 for driving the multiple scanning lines 20. The gate driving circuit 10 includes multiple-stage gate driving units 11 and a control chip 12. One gate driving unit 11 corresponds to one scanning line 20. An output terminal of each gate driving unit 11 is connected with the scanning line 20.

The following utilizes an n-th stage gate driving unit 11 for illustrating the present invention, wherein, n is an integer which is greater than or equal to 1.

Figure 2:
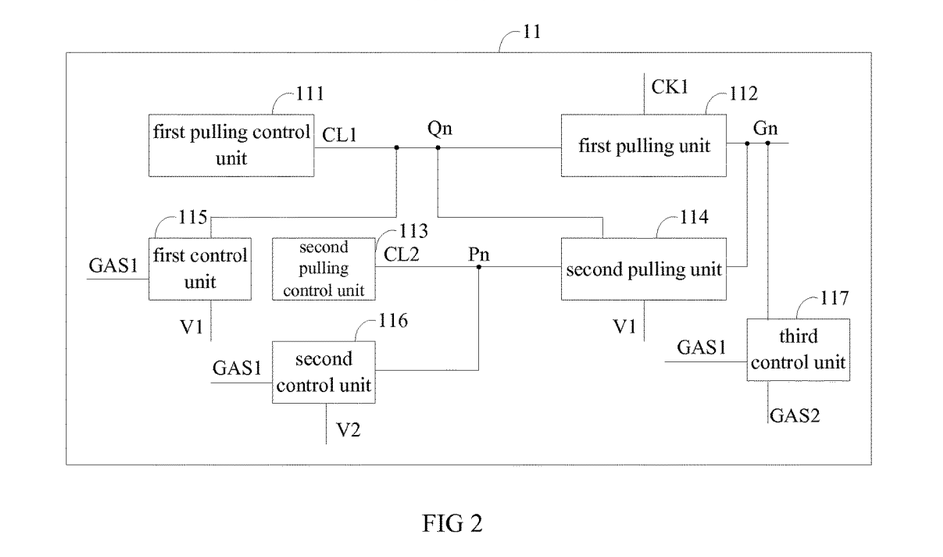
FIG. 2 is a schematic structure diagram of a gate driving unit shown in FIG. 1.

As shown in FIG. 2, the n-th stage gate driving unit 11 includes a first pulling control unit 111, a first pulling unit 112, a second pulling control unit 113, a second pulling unit 114, a first control unit 115, a second control unit 116 and a third control unit 117.

The first pulling control unit 111 is used for outputting a first pulling control signal CL1 at a first node Qn. The first pulling unit 112 is coupled with the first node Qn. The first pulling unit 112 receives a first clock signal CK1, and pulls a voltage level of an output terminal of a gate driving signal to a first voltage level according to the first pulling control signal CL1 and first clock signal CK1. The gate driving signal Gn is at the first voltage level. The gate driving signal Gn is used for driving the scanning line 20. Preferably, the first pulling control signal CL1 is at the first voltage level.

The second pulling control unit 113 is used for outputting a second pulling control signal CL2 at a second node Pn. The second pulling unit 114 is coupled with the first node Qn and the second node Pn. The second pulling unit 114 receives a first voltage reference signal V1, and pulls the voltage level of the first node Qn to a second voltage level of the first voltage reference signal V1 according to the second pulling control signal CL2.

A first control unit 115 is coupled with the first node Qn. The first control unit 115 receives a first control signal GAS1 and the first voltage reference signal V1. The first control unit 115 pulls the voltage level of the first node Qn to the second voltage level according to the first control signal GAS1. At this time, the first pulling control signal CL1 is at the second voltage level.

The second control unit 116 is coupled with the second node Pn, the second control unit 116 receives the first control signal GAS1 and a second voltage reference signal V2. The second control unit 116 also pulls a voltage level of the second node Pn to a third voltage level of the second voltage reference signal V2 according to the control signal GAS1. The second pulling unit 114 is further coupled with the output terminal of the gate driving signal. The second pulling unit 114 pulls the voltage level of the gate driving signal Gn to the second voltage level. Preferably, the first voltage level and the third voltage level are the same.

The third control unit 117 is couple with the output terminal of the gate driving signal. The third control unit 117 receives the first control signal GAS1 and the second control signal GAS2, and pulls the voltage level of the gate driving signal according to the first control signal GAS1 and the second control signal GAS2. For example, the third control unit 117 pulls the voltage level of the gate driving signal to the second voltage level according to the first control signal GAS1 and the second control signal GAS2.

When the voltage level of the gate driving signal Gn is at the first voltage level, the scanning line 20 is turned on. When the voltage level of the gate driving signal Gn is at the second voltage level, the scanning line is turned off. The control chip 12 is used for pulling the first clock signal CK1 and the first voltage reference signal V1, the first control signal GAS1 and the second control signal GAS2 to the first voltage level. At this time, the voltage level of the gate driving signal Gn is at the first voltage level. The scanning line 20 driven by the gate driving signal Gn is turned on so that the scanning lines 20 driven by the gate driving circuit 10 are all turned on in order to stably realize the All-Gate-On function.

After the All-Gate-On function is finished, the first control unit 115 pulls the voltage level of the first node Qn to the second voltage level according to the first control signal GAS1, and the first pulling unit 112 is turned off. The second control unit 116 pulls the voltage level of the second node Pn to the third voltage level of the second voltage reference signal V2 according to the first control signal GAS1. The second pulling unit 114 pulls the voltage level of the gate driving signal Gn to the second voltage level. The third control unit 117 pulls the voltage level of the gate driving signal Gn to the second voltage level according to the first control signal GAS1 and the second control signal GAS2. At this time, the scanning line is turned off so that after finishing the All-Gate-On function, all scanning lines 20 return to a turn-off voltage level.

Figure 3:
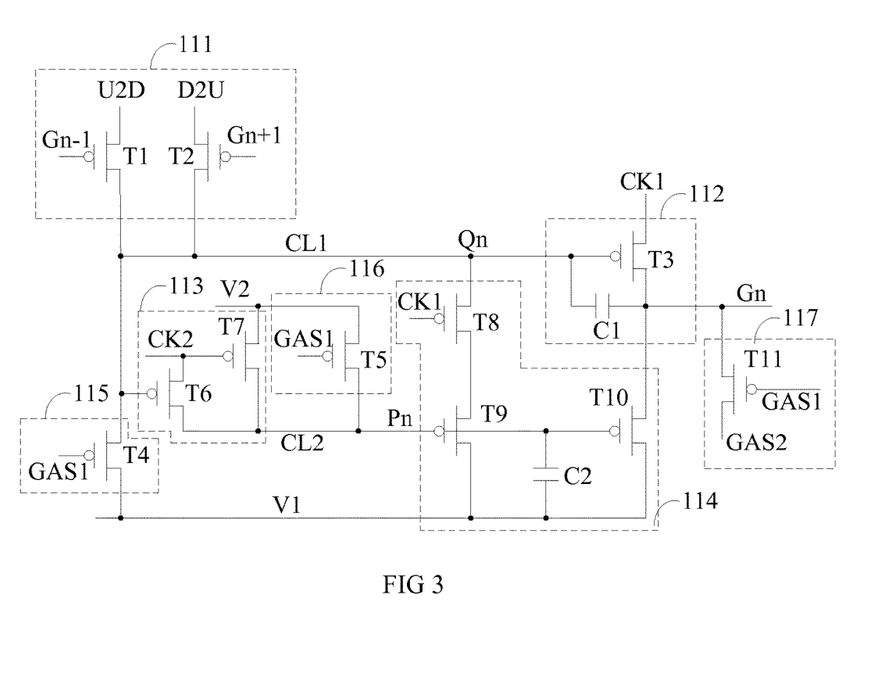
FIG. 3 is a circuit diagram of a gate driving unit according to a second embodiment of the present invention.

The present invention also provides a gate driving unit of a second embodiment, and described based on the gate driving unit 11 disclosed in the first embodiment. As shown in FIG. 3, the first pulling control unit 111 includes a first thin-film transistor T1 and a second thin-film transistor T2. A first terminal of the first thin-film transistor T1 receives a first signal U2D. A second terminal of the first thin-film transistor T1 receives a gate driving signal Gn−1 of a previous stage. A third terminal of the first thin-film transistor T1 is connected with the first node Qn. A first terminal of the second thin-film transistor T2 receives a second signal D2U. A second terminal of the second thin-film transistor T2 receives a gate driving signal Gn+1 of a next stage. A third terminal of the second thin-film transistor T2 is connected with the first node Qn. Wherein, the first pulling control unit 111 is used for controlling a forward and backward scanning signal of the gate driving unit 11. Besides, the first pulling control unit 11 is used for selectively inputting the first signal U2D or the second signal D2U according to the gate driving signal Gn−1 of the previous stage or the gate driving signal Gn+1 of the next stage. Wherein, the first signal U2D and the second signal D2U are opposite. For example, when the first signal U2D is at a high voltage level, the second signal D2U is at a low voltage level. The third terminal of the first thin-film transistor T1 and the third terminal of the second thin-film transistor T2 output the first pulling control signal CL1.

The first pulling unit 112 includes a third thin-film transistor T3 and a first capacitor C1. A first terminal of the third thin-film transistor T3 receives the first clock signal CK1. A second terminal of the third thin-film transistor T3 is connected with the first node Qn. A third terminal of the third thin-film transistor T3 is the output terminal of the gate driving signal. The first capacitor C1 is connected between the second terminal and the third terminal of the third thin-film transistor T3.

The first control unit 115 includes a fourth thin-film transistor T4. A first terminal of the fourth thin-film transistor T4 is connected with the first node Qn. A second terminal of the fourth thin-film transistor T4 receives the first control signal GAS1. A third terminal of the thin-film transistor T4 receives the first voltage reference signal V1.

The second control unit 116 includes a fifth thin-film transistor T5. A first terminal of the fifth thin-film transistor T5 receives the second voltage reference signal V2. A second terminal of the fifth thin-film transistor T5 receives the first control signal GAS1. A third terminal of the fifth thin-film transistor T5 is connected with the second node Pn.

The second pulling control unit 113 includes a sixth thin-film transistor T6 and a seventh thin-film transistor T7. A first terminal of the sixth thin-film transistor T6 receives the second clock signal CK2. A second terminal of the sixth thin-film transistor T6 is connected with the first terminal of the fourth thin-film transistor T4. A third terminal of the sixth thin-film transistor T6 is connected with a third terminal of the seventh thin-film transistor T7 and the second node Pn. A first terminal of the seventh thin-film transistor T7 receives the second voltage reference signal V2. A second terminal of the seventh thin-film transistor T7 receives the second clock signal CK2. The third terminal of the sixth thin-film transistor T6 and the third terminal of the seventh thin-film transistor T7 output the second pulling control signal CL2.

The second pulling unit 114 includes an eighth thin-film transistor T8, a ninth thin-film transistor T9, a tenth thin-film transistor T10 and a second capacitor C2. A first terminal of the eighth thin-film transistor T8 is connected with the second terminal of the third thin-film transistor T3. A second terminal of the eighth thin-film transistor T8 receives the first clock signal CK1. A third terminal of the eighth thin-film transistor T8 is connected with a first terminal of the ninth thin-film transistor T9. A second terminal of the ninth thin-film transistor T9 is connected with the third terminal of the seventh thin-film transistor T7. A third terminal of the ninth thin-film transistor T9 receives the first voltage reference signal V1. A first terminal of the tenth thin-film transistor T10 is connected with the third terminal of the thin-film transistor T3. A second terminal of the tenth thin-film transistor T10 is connected with the second terminal of the ninth thin-film transistor T9. A third terminal of the tenth thin-film transistor T10 receives the first voltage reference signal V1. The second capacitor C2 is connected between the second terminal and the third terminal of the tenth thin-film transistor T10.

The third control unit 117 includes an eleventh thin-film transistor T11, a first terminal of the eleventh thin-film transistor T11 is connected with the third terminal of the third thin-film transistor T3, a second terminal of the eleventh thin-film transistor T11 receives the first control signal GAS1, and a third terminal of the eleventh thin-film T11 transistor receives the second control signal GAS2.

Preferably, the first thin-film transistor T1, the second thin-film transistor T2, the third thin-film transistor T3, the fourth thin-film transistor T4, the fifth thin-film transistor T5, the sixth thin-film transistor T6, the seventh thin-film transistor T7, the eighth thin-film transistor T8, the ninth thin-film transistor T9, the tenth thin-film transistor T10, and the eleventh thin-film transistor T11 are all P-type thin-film transistors. A P-type thin-film transistor is turned on (conductive) when a gate of the P-type thin-film transistor is at a low voltage level.

Figure 4:
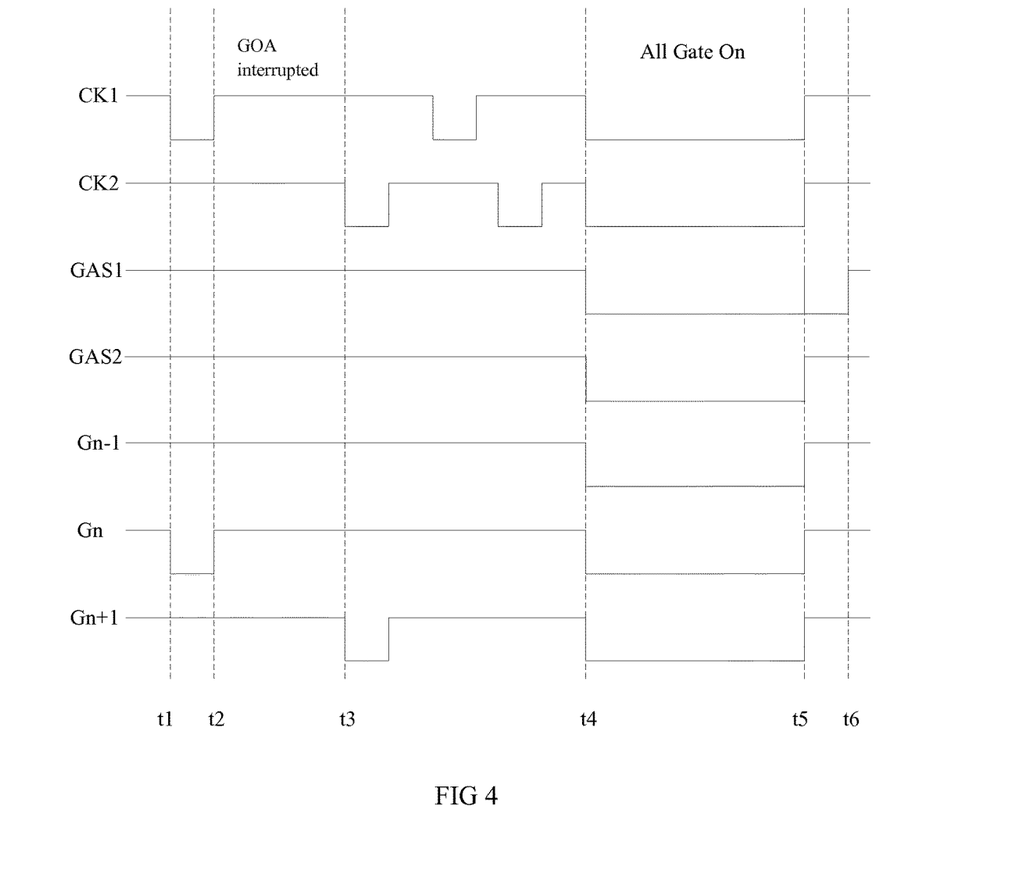
FIG. 4 is a timing diagram of a first clock signal, a second clock signal, a first control signal, a second control signal and a gate driving signal shown in FIG. 3.

Combining with a timing diagram shown in FIG. 4 for describing the operation principle of the gate driving unit of the present embodiment in detail.

Preferably, each of the first voltage level and the third voltage level is a low level, and the second voltage level is a high level. That is, the first voltage reference signal V1 is a high-level voltage VGH, and the second voltage reference signal V2 is a low-level voltage VGL.

As shown in FIG. 4, between time t1-t2, the first clock signal CK1 is at a low voltage level and the second clock signal CK2 is at a high voltage level. The first control signal GAS1 and the second control signal GAS2 are both at a high voltage level. The first pulling control signal CL1 outputted from the first pulling control unit 111 is at a low voltage level (the first voltage level). The third thin-film transistor T3 is turned on (conductive). The voltage level of the output terminal of the gate driving signal and the voltage level of the first clock signal CK1 are the same. The gate driving signal Gn is at a low voltage level. A scanning line 20 corresponding to the gate driving signal Gn is turned on, that is, the first pulling unit 112 pulls the voltage level of the output terminal of the gate driving signal Gn to the first voltage level (low voltage level) according to the first pulling control signal CL1 and the first clock signal CK1. At this time, the fourth thin-film transistor T4, the fifth thin-film transistor T5, the eleventh thin-film transistor T11 and the seventh thin-film transistor T7 are turned off (disconnected). The sixth thin-film transistor T6 and the eighth thin-film transistor T8 are turned on (conductive). The second pulling control signal CL2 is at a high voltage level (the second voltage level). The ninth thin-film transistor T9 and the tenth thin-film transistor T10 are turned off (disconnected).

During time t2-t3, the first clock signal CK1 is at a high voltage level, the second clock signal CK2 is at a high voltage level and the first control signal GAS1 and the second control signal are at a high voltage level. The first pulling control signal CL1 outputted from the first pulling control unit 111 is at a low voltage level (the first voltage level). The third thin-film transistor T3 is turned on (conductive). The voltage level of the output terminal of the gate driving signal and the voltage level of the first clock signal CK1 are the same. The gate driving signal Gn is at a high voltage level. The scanning line 20 corresponding to the gate driving signal Gn is turned off. At this time, the fourth thin-film transistor T4, the fifth thin-film transistor T5, the eleventh thin-film transistor T11, the seventh thin-film transistor T7 and the eighth thin-film transistor T8 are turned off (disconnected). The sixth thin-film transistor T6 is turned on (conductive). The second pulling control signal CL2 is at a high voltage level (the second voltage level). The ninth thin-film transistor T9 and the tenth thin-film transistor T10 are turned off (disconnected).

At this time, all gate driving signals are at a high voltage level. The gate driving circuit is interrupted. That is, the gate driving signals Gn−1, Gn and Gn+1 are all at a high voltage level.

During time t4-t5, the control chip 12 pulls the first clock signal CK1 and the first voltage reference signal V1, the first control signal GAS1 and the second control signal GAS2 to the first voltage level (a low voltage level). The first clock signal CK1 is at a low voltage level, and the second clock signal CK2 is at a low voltage level. The first control signal GAS1 is at a low voltage level. The second control signal GAS2 is at a low voltage level. The fourth thin-film transistor T4, the fifth thin-film transistor T5 and the eleventh thin-film transistor T11 are turned on (conductive). The seventh thin-film transistor T7 is turned on (conductive). The second pulling control signal CL2 is at a low voltage level. The eighth thin-film transistor T8 and the ninth thin-film transistor T9 are turned on (conductive). The first node Qn receives the first voltage reference signal V1 through the eighth thin-film transistor T8 and the ninth thin-film transistor T9. That is, the second pulling unit 114 pulls the voltage level of the first node Qn to the first voltage reference signal V1 according to the second pulling control signal CL2. At this time, the voltage level of the first node Qn is pulled to a low level. The third thin-film transistor T3 and the sixth thin-film transistor T6 are both turned on (conductive). The voltage level of the gate driving signal Gn is at a low voltage level. The tenth thin-film transistor is turned on (conductive). The voltage level of the gate driving signal Gn and the voltage level of the first voltage reference signal V1 are the same. The eleventh thin-film transistor T11 is turned on (conductive) to pull the voltage level of the gate driving signal Gn to be the same as the voltage level of the second control signal GAS2 in order to ensure that an outputting of the gate driving signal Gn is at a low voltage level. The scanning lines 20 driven by the gate driving signal Gn is turned on such that all scanning lines 20 driven by the gate driving circuit 10 are turned on in order to stably realize the All-Gate-On function.

After finishing the All-Gate-On function, during time t5-t6, the first clock signal CK1 is at a high voltage level, the second clock CK2 is at a high voltage level and the first control signal GAS1 is at a low voltage level. The second control signal GAS2 is at a high voltage level. The fourth thin-film transistor T4 is turned on (conductive) to pull the voltage level of the first node Qn to a high voltage level. The first pulling control signal CL1 is at a high voltage level. That is, the first control unit 115 pulls the voltage level of the first node Qn to the second voltage level according to the control signal GAS1. At this time, the third thin-film transistor T3 is turned off (disconnected). That is, the first pulling unit 112 is turned off (disconnected).

The fifth thin-film transistor T5 is turned on (conductive) to pull the voltage level of the second node Pn to a low level. The second pulling control signal CL2 is at a low voltage level. That is, the second control unit 116 pulls the voltage level of the second node Pn to the third voltage level of the second voltage reference signal V2 according to the first control signal GAS1. The ninth thin-film transistor T9 and the tenth thin-film transistor T10 are turned on. At this time, the tenth thin-film transistor T10 pulls the voltage level of the gate driving gate signal Gn to a high voltage level. That is, the second pulling unit 114 pulls the voltage level of the gate driving signal Gn to the second voltage level. The eleventh thin-film transistor T11 is turned on, and the eleventh thin-film transistor T11 pulls the voltage level of the gate driving signal Gn to be the same as the voltage level of the second control signal GAS2, that is, a high voltage level. The gate driving signal Gn is at a high voltage level. The scanning line 20 driven by the gate driving signal Gn is turned off so that after finishing the All-Gate-On function, all of the scanning lines 20 all return to a turning-off voltage level. At this time, the sixth thin-film transistor T6, the seventh thin-film transistor T7 and the eighth thin-film transistor T8 are turned off (disconnected).

In another embodiment, the person skilled in the art can select the first thin-film transistor T1, the second thin-film transistor T2, the third thin-film transistor T3, the fourth thin-film transistor T4, the fifth thin-film transistor T5, the sixth thin-film transistor T6, the seventh thin-film transistor T7, the eighth thin-film transistor T8, the ninth thin-film transistor T9, the tenth thin-film transistor T10 and the eleventh thin-film transistor T11 as N-type thin-film transistors. An N-type thin-film transistor is turned on when a gate of the N-type thin-film transistor is at a high voltage level. At this time, a changing of voltage levels of the nodes is opposite to a changing of voltage levels of the nodes described above when scanning and driving. Besides, voltage levels of the first voltage reference signal V1 and the second voltage reference signal V2 are also opposite to the voltage levels of the first voltage reference signal V1 and the second voltage reference signal V2 described above when scanning and driving. That is, when using the N-type thin-film transistors, the first voltage reference signal V1 is at a low level, and the second voltage reference signal V2 is a high level, no more repeating.

Figure 5:
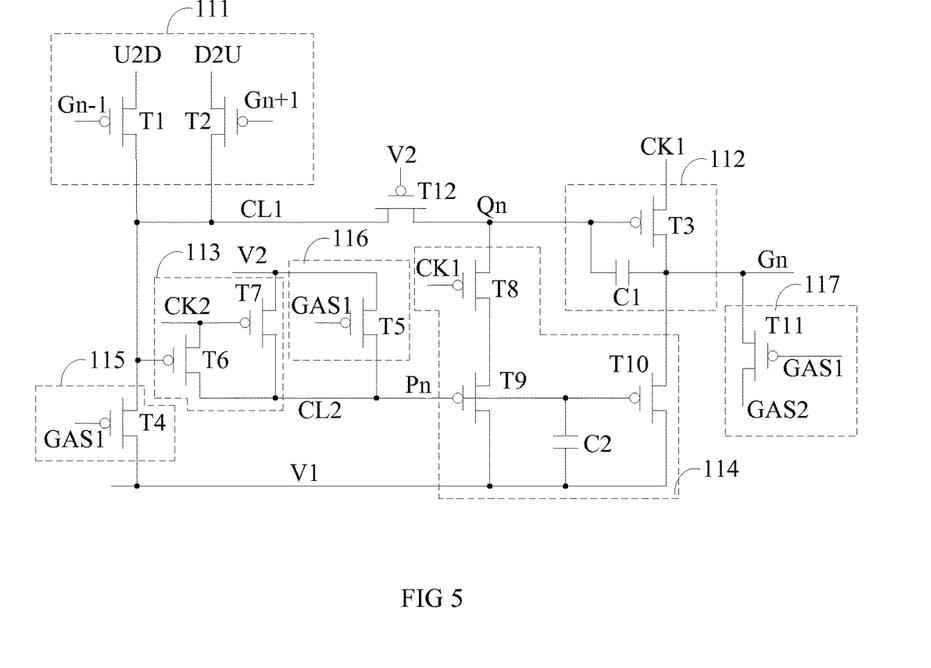
FIG. 5 is a circuit diagram of a gate driving unit according to a third embodiment of the present invention.

The present invention also provides a gate driving unit of a third embodiment, and described based on the gate driving unit disclosed in the second embodiment. The difference between the gate driving unit of the present embodiment and the gate driving unit described in the second embodiment is: the gate driving unit further includes a twelfth thin-film transistor T12. As shown in FIG. 5, a first terminal of the twelfth thin-film transistor T12 is connected with the first node Qn. A second terminal of the twelfth thin-film transistor T12 receives the second voltage reference signal V2. A third terminal of the twelfth thin-film transistor T12 is connected with the third terminal of the second thin-film transistor T2, the third terminal of the first thin-film transistor T1 and the first terminal of the fourth thin-film transistor T4.

Preferably, the twelfth thin-film transistor T12 is a P-type thin-film transistor. When the second voltage reference signal V2 is at a low voltage level, the twelfth thin-film transistor T12 is turned on (conductive).

In another embodiment, the person skilled in the art can select the first thin-film transistor T1, the second thin-film transistor T2, the third thin-film transistor T3, the fourth thin-film transistor T4, the fifth thin-film transistor T5, the sixth thin-film transistor T6, the seventh thin-film transistor T7, the eighth thin-film transistor T8, the ninth thin-film transistor T9, and the tenth thin-film transistor T10, the eleventh thin-film transistor T11 and the twelfth thin-film transistor T12 as N-type thin-film transistors.

Figure 6:
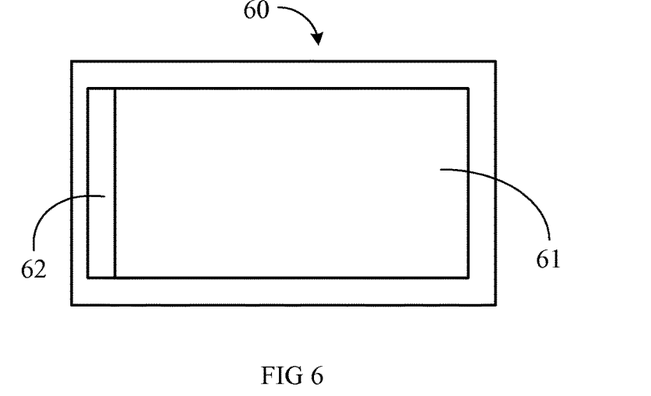
FIG. 6 is a schematic structure diagram of a liquid crystal display device according to a first embodiment of the present invention.

The present invention also provides a liquid crystal display device. As shown in FIG. 6, the liquid crystal display device 60 disclosed by the present embodiment includes a display panel 61 and a gate driving circuit 62 described in the above embodiments, no more repeating.

It should be noted that liquid crystal display device 60 described in the present embodiment includes a mobile phone, a monitor or a television.

In summary, in the present invention, the gate driving circuit includes multiple-stage gate driving units and a control chip. Each stage gate driving unit includes a first pulling control unit, a first pulling unit, a second pulling control unit, a second pulling unit, a first control unit, a second control unit and a third control unit. The control chip is used for pulling a first clock signal and a first voltage reference signal, a first control signal and a second control signal to a first voltage level. Accordingly, the scanning lines driven by the gate driving circuit are all turned on in order to stably realize the All-Gate-On function. Besides, after the All-Gate-On function is finished, the first control unit pulls a voltage level of the first node to the second voltage level according to the first control signal GAS1, and the first pulling unit is turned off. The second control unit pulls a voltage level of the second node to the third voltage level of the second voltage reference signal according to the first control signal. The second pulling unit pulls the voltage level of the gate driving signal to the second voltage level. The third control unit pulls the voltage level of the gate driving signal to the second voltage level according to the first control signal and the second control signal. At this time, the scanning line is turned off so that after finishing the All-Gate-On function, all scanning lines return to a turn-off voltage level.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A gate driving circuit, wherein, the gate driving circuit includes multiple-stage gate driving units and a control chip, wherein each stage gate driving unit comprises:
   a first pulling control circuit for outputting a first pulling control signal at a first node;
   a first pulling circuit coupled with the first node, receiving a first clock signal, pulling a voltage level of an output terminal of a gate driving signal to a first voltage level according to the first pulling control signal and first clock signal in order to output the gate driving signal;
   a second pulling control circuit for outputting a second pulling control signal at a second node;
   a second pulling circuit coupled with the first node and the second node, receiving a first voltage reference signal, and pulling a voltage level of the first node to a second voltage level of the first voltage reference signal according to the second pulling control signal, and the second pulling circuit pulls a voltage level of the gate driving signal to the second voltage level;
   a first control circuit coupled with the first node, receiving a first control signal and the first voltage reference signal, pulling the voltage level of the first node to the second voltage level according to the first control signal;
   a second control circuit coupled with the second node, receiving the first control signal and a second voltage reference signal, pulling a voltage level of the second node to a third voltage level of the second voltage reference signal according to the first control signal; and a third control circuit coupled with the output terminal of the gate driving signal, receiving the first control signal and a second control signal, and pulling the voltage level of the gate driving signal according to the first control signal and the second control signal;

wherein, control chip is used for pulling the first clock signal, the first voltage reference signal, the first control signal and the second control signal to the first voltage level such that scanning lines driven by the gate driving circuit are all turned on;

wherein, the first pulling control circuit includes a first thin-film transistor and a second thin-film transistor;

a first terminal of the first thin-film transistor receives a first signal, a second terminal of the first thin-film transistor receives a gate driving signal of a previous stage, and a third terminal of the first thin-film transistor is connected with the first node; and a first terminal of the second thin-film transistor receives a second signal; a second terminal of the second thin-film transistor receives a gate driving signal of a next stage, and a third terminal of the second thin-film transistor is connected with the first node;

wherein, the first pulling circuit includes a third thin-film transistor and a first capacitor, a first terminal of the third thin-film transistor receives the first clock signal, a second terminal of the third thin-film transistor is connected with the first node, a third terminal of the third thin-film transistor is the output terminal of the gate driving signal, and the first capacitor is connected between the second terminal and the third terminal of the third thin-film transistor;

wherein, the first control circuit includes a fourth thin-film transistor, a first terminal of the fourth thin-film transistor is connected with the first node, a second terminal of the fourth thin-film transistor receives the first control signal, and a third terminal of the thin-film transistor receives the first voltage reference signal;

wherein, the second control circuit includes a fifth thin-film transistor, a first terminal of the fifth thin-film transistor receives the second voltage reference signal, a second terminal of the fifth thin-film transistor receives the first control signal, and a third terminal of the fifth thin-film transistor is connected with the second node;

wherein, the second pulling control circuit includes a sixth thin-film transistor and a seventh thin-film transistor, a first terminal of the sixth thin-film transistor receives the second clock signal, a second terminal of the sixth thin-film transistor is connected with the first terminal of the fourth thin-film transistor, a third terminal of the sixth thin-film transistor is connected with a third terminal of the seventh thin-film transistor and the second node, a first terminal of the seventh thin-film transistor receives the second voltage reference signal, a second terminal of the seventh thin-film transistor receives the second clock signal; and the second pulling circuit includes an eighth thin-film transistor, a ninth thin-film transistor, a tenth thin-film transistor and a second capacitor, a first terminal of the eighth thin-film transistor is connected with the second terminal of the third thin-film transistor, a second terminal of the eighth thin-film transistor receives the first clock signal, a third terminal of the eighth thin-film transistor is connected with a first terminal of the ninth thin-film transistor, a second terminal of the ninth thin-film transistor is connected with the third terminal of the seventh thin-film transistor, a third terminal of the ninth thin-film transistor receives the first voltage reference signal, a first terminal of the tenth thin-film transistor is connected with the third terminal of the thin-film transistor, a second terminal of the tenth thin-film transistor is connected with the second terminal of the ninth thin-film transistor, a third terminal of the tenth thin-film transistor receives the first voltage reference signal, the second capacitor is connected between the second terminal and the third terminal of the tenth thin-film transistor.

2. The gate driving circuit according to claim 1, wherein, the third control circuit includes an eleventh thin-film transistor, a first terminal of the eleventh thin-film transistor is connected with the third terminal of the third thin-film transistor, a second terminal of the eleventh thin-film transistor receives the first control signal and a third terminal of the eleventh thin-film transistor receives the second control signal.

3. The gate driving circuit according to claim 2, wherein, the gate driving unit further includes a twelfth thin-film transistor, a first terminal of the twelfth thin-film transistor is connected with the first node, a second terminal of the twelfth thin-film transistor receives the second voltage reference signal, and a third terminal of the twelfth thin-film transistor is connected with the third terminal of the second thin-film transistor, the third terminal of the first thin-film transistor and the first terminal of the fourth thin-film transistor.

4. The gate driving circuit according to claim 3, wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, the tenth thin-film transistor, eleventh thin-film transistor and the twelfth thin-film transistor are all P-type thin-film transistors; and when the first control signal and the second control signal are at a low voltage level, the fourth thin-film transistor is turned on, the voltage level of the second terminal of the third thin-film transistor is pulled to the second voltage level, the third thin-film transistor is turned off; the fifth thin-film transistor is turned on, the voltage level of the second terminal of the tenth thin-film transistor is pulled to the third voltage level, the tenth thin-film transistor is turned on, the eleventh thin-film transistor is turned on in order to pull the voltage level of the gate driving signal to the second voltage level.

5. The gate driving circuit according to claim 3, wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, and the tenth thin-film transistor, the eleventh thin-film transistor and the twelfth thin-film transistor are all N-type thin-film transistors.

6. A liquid crystal display device, wherein, the liquid crystal display device includes a gate driving circuit, the gate driving circuit includes multiple-stage gate driving units and a control chip, and each stage gate driving unit comprises:

a first pulling control circuit for outputting a first pulling control signal at a first node;

a first pulling circuit coupled with the first node, receiving a first clock signal, pulling a voltage level of an output terminal of a gate driving signal to a first voltage level according to the first pulling control signal and first clock signal in order to output the gate driving signal;

a second pulling control circuit for outputting a second pulling control signal at a second node;

a second pulling circuit coupled with the first node and the second node, receiving a first voltage reference signal, and pulling a voltage level of the first node to a second voltage level of the first voltage reference signal according to the second pulling control signal, and the second pulling circuit pulls a voltage level of the gate driving signal to the second voltage level;

a first control circuit coupled with the first node, receiving a first control signal and the first voltage reference signal, pulling the voltage level of the first node to the second voltage level according to the first control signal;

a second control circuit coupled with the second node, receiving the first control signal and a second voltage reference signal, pulling a voltage level of the second node to a third voltage level of the second voltage reference signal according to the first control signal; and a third control circuit coupled with the output terminal of the gate driving signal, receiving the first control signal and a second control signal, and pulling the voltage level of the gate driving signal according to the first control signal and the second control signal;

wherein, control chip is used for pulling the first clock signal, the first voltage reference signal, the first control signal and the second control signal to the first voltage level such that scanning lines driven by the gate driving circuit are all turned on;

wherein, the first pulling control circuit includes a first thin-film transistor and a second thin-film transistor;

a first terminal of the first thin-film transistor receives a first signal, a second terminal of the first thin-film transistor receives a gate driving signal of a previous stage, and a third terminal of the first thin-film transistor is connected with the first node; and a first terminal of the second thin-film transistor receives a second signal; a second terminal of the second thin-film transistor receives a gate driving signal of a next stage, and a third terminal of the second thin-film transistor is connected with the first node;

wherein, the first pulling circuit includes a third thin-film transistor and a first capacitor, a first terminal of the third thin-film transistor receives the first clock signal, a second terminal of the third thin-film transistor is connected with the first node, a third terminal of the third thin-film transistor is the output terminal of the gate driving signal, and the first capacitor is connected between the second terminal and the third terminal of the third thin-film transistor;

wherein, the first control circuit includes a fourth thin-film transistor, a first terminal of the fourth thin-film transistor is connected with the first node, a second terminal of the fourth thin-film transistor receives the first control signal, and a third terminal of the thin-film transistor receives the first voltage reference signal;

wherein, the second control circuit includes a fifth thin-film transistor, a first terminal of the fifth thin-film transistor receives the second voltage reference signal, a second terminal of the fifth thin-film transistor receives the first control signal, and a third terminal of the fifth thin-film transistor is connected with the second node;

wherein, the second pulling control circuit includes a sixth thin-film transistor and a seventh thin-film transistor, a first terminal of the sixth thin-film transistor receives the second clock signal, a second terminal of the sixth thin-film transistor is connected with the first terminal of the fourth thin-film transistor, a third terminal of the sixth thin-film transistor is connected with a third terminal of the seventh thin-film transistor and the second node, a first terminal of the seventh thin-film transistor receives the second voltage reference signal, a second terminal of the seventh thin-film transistor receives the second clock signal; and the second pulling circuit includes an eighth thin-film transistor, a ninth thin-film transistor, a tenth thin-film transistor and a second capacitor, a first terminal of the eighth thin-film transistor is connected with the second terminal of the third thin-film transistor, a second terminal of the eighth thin-film transistor receives the first clock signal, a third terminal of the eighth thin-film transistor is connected with a first terminal of the ninth thin-film transistor, a second terminal of the ninth thin-film transistor is connected with the third terminal of the seventh thin-film transistor, a third terminal of the ninth thin-film transistor receives the first voltage reference signal, a first terminal of the tenth thin-film transistor is connected with the third terminal of the thin-film transistor, a second terminal of the tenth thin-film transistor is connected with the second terminal of the ninth thin-film transistor, a third terminal of the tenth thin-film transistor receives the first voltage reference signal, the second capacitor is connected between the second terminal and the third terminal of the tenth thin-film transistor.

7. The liquid crystal display device according to claim 6, wherein, the third control circuit includes an eleventh thin-film transistor, a first terminal of the eleventh thin-film transistor is connected with the third terminal of the third thin-film transistor, a second terminal of the eleventh thin-film transistor receives the first control signal and a third terminal of the eleventh thin-film transistor receives the second control signal.

8. The liquid crystal display device according to claim 7, wherein, the gate driving unit further includes a twelfth thin-film transistor, a first terminal of the twelfth thin-film transistor is connected with the first node, a second terminal of the twelfth thin-film transistor receives the second voltage reference signal, and a third terminal of the twelfth thin-film transistor is connected with the third terminal of the second thin-film transistor, the third terminal of the first thin-film transistor and the first terminal of the fourth thin-film transistor.

9. The liquid crystal display device according to claim 8, wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, the tenth thin-film transistor, eleventh thin-film transistor and the twelfth thin-film transistor are all P-type thin-film transistors; and when the first control signal and the second control signal are at a low voltage level, the fourth thin-film transistor is turned on, the voltage level of the second terminal of the third thin-film transistor is pulled to the second voltage level, the third thin-film transistor is turned off; the fifth thin-film transistor is turned on, the voltage level of the second terminal of the tenth thin-film transistor is pulled to the third voltage level, the tenth thin-film transistor is turned on, the eleventh thin-film transistor is turned on in order to pull the voltage level of the gate driving signal to the second voltage level.

10. The liquid crystal display device according to claim 8, wherein, the first thin-film transistor, the second thin-film transistor, the third thin-film transistor, the fourth thin-film transistor, the fifth thin-film transistor, the sixth thin-film transistor, the seventh thin-film transistor, the eighth thin-film transistor, the ninth thin-film transistor, and the tenth thin-film transistor, the eleventh thin-film transistor and the twelfth thin-film transistor are all N-type thin-film transistors.

* * * * *